J. W. APPLIN.
DRAINING MEANS FOR OIL PANS.
APPLICATION FILED JAN. 2, 1920.
1,365,644.
Patented Jan. 18, 1921.
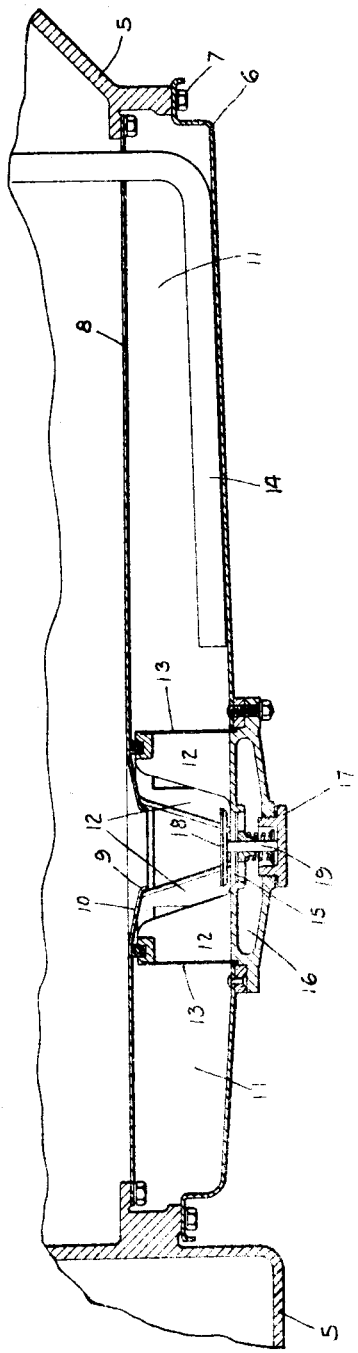
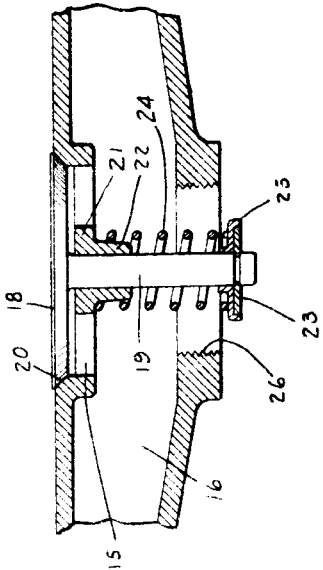
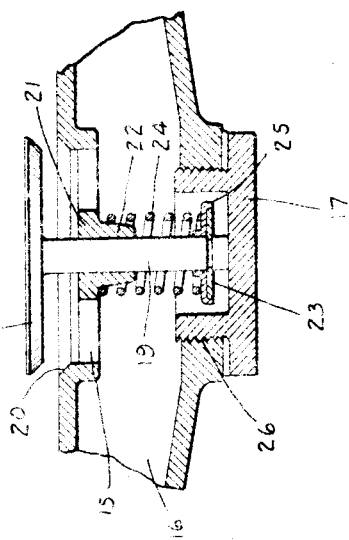
INVENTOR
JOHN W. APPLIN.
BY
Lockwood Lockwood
ATTORNEYS

UNITED STATES PATENT OFFICE.

JOHN W. APPLIN, OF INDIANAPOLIS, INDIANA, ASSIGNOR TO LA FAYETTE MOTORS COMPANY, OF INDIANAPOLIS, INDIANA, A CORPORATION OF DELAWARE.

DRAINING MEANS FOR OIL-PANS.

1,365,644.     Specification of Letters Patent.     Patented Jan. 18, 1921.

Application filed January 2, 1920. Serial No. 349,101.

*To all whom it may concern:*

Be it known that I, JOHN W. APPLIN, a citizen of the United States, and a resident of Indianapolis, county of Marion, and State of Indiana, have invented a certain new and useful Draining Means for Oil-Pans; and I do hereby declare that the following is a full, clear, and exact description thereof, reference being had to the accompanying drawings, in which like numerals refer to like parts.

The object of this invention is to provide an improved oil pan construction for an internal combustion engine or the like and to provide the same with novel draining and straining means.

One of the features of the invention is in providing a strainer of such shape that the oil passing therethrough is subjected to a change in direction which precipitates all foreign matter carried by the oil.

Another feature of the invention is in providing a sump adjacent the strainer for collecting the foreign particles deposited by the oil.

A further feature of the invention is in providing automatic valve means between the oil pan and the sump, whereby the oil in the oil pan will be retained within the oil pan while the sump is being drained of the collected foreign matter.

The full nature of the invention will be understood from the accompanying drawings and the following description and claims.

In the drawings, which are made a part of this application, Figure 1 is a central sectional view of a crank-case of an internal combustion engine provided with an oil pan embodying the invention. Fig. 2 is an enlarged detailed view of a valve means shown in Fig. 1, the valve being shown in the same position. Fig. 3 is a view similar to Fig. 2, but shows the valve seated and the draining plug of the sump removed.

In the drawings 5 indicates a crank-case of an internal combustion engine or the like, and 6 an oil pan secured thereto by any suitable means, such as the bolts 7. Within the crank-case and positioned above the oil pan is suitably secured to the case a baffle plate 8, the same having an opening 9 therein, the latter being surrounded by a dished conducting portion 10. From the foregoing it will be understood that the oil coming from the engine system strikes the baffle plate and passes downwardly into the oil chamber 11 formed between the baffle plate and the oil pan. Positioned beneath the opening 9 and surrounding the same are inwardly extending bracket ribs 12, said ribs being secured at their upper and lower edges to the baffle plate 8 and the oil pan respectively.

Concentric with the opening 9 is a cylindrical gauze strainer 13 of suitable material. Oil entering the chamber 11 through the opening 9 changes direction before it passes through the strainer 13. Since a fluid when it changes the direction deposits the solid matter carried thereby, the foreign matter carried by the oil will be precipitated therefrom and will collect at the bottom of the oil pan. The oil is further refined when it passes through the cylindrical gauze strainer. The oil passes into the chamber 11 from which it is supplied to the engine through a suction pipe 14 by any suitable pump means, not shown.

Positioned beneath the opening 9 and near the bottom of the straining chamber is an opening 15, said opening being the lowest point in the oil pan. Beneath said opening and communicating therewith is a sump chamber 16, the same being closed by a drainage plug 17, the latter being suitably secured in the lowest portion of the sump chamber. From the foregoing it will be understood that the foreign matter will drain into the sump by gravity, and when the plug is removed, the same will drain therefrom by gravity.

There is shown herein a valve 18, the same being provided with a stem 19 and a seat 20 formed in the opening 15 of the oil pan. Herein the valve is positioned within said opening and upon said seat by a transversely extending bracket 21, the same having an annular collar 22 extending downwardly therefrom. Positioned upon the opposite end of said valve stem is an open washer 23 rigid therewith. A spring 24 surrounds said valve stem and said collar and is retained in position thereon by a retaining washer 25, the same being loosely mounted on the valve stem and being limited in movement thereon by the split washer 23. The spring thus tends to normally hold the washers and the valve is seated position, as shown in Fig. 3. The stem 19 is of sufficient length, so that when the plug 17 is secured in the drainage opening 26, said stem will be held in the position shown in Fig. 2, which maintains the valve in the unseated position. With this construction the foreign particles always may pass from the chamber above the valve into the sump chamber beneath the same and be collected. When it is desired to clean the sump of the material collected therein, the plug 17 is removed and the valve, under the influence of the spring 24, is automatically seated as the plug is removed. The oil chamber is thus separated from the sump chamber, so that the latter may be cleaned without draining the oil. Should it be desired to drain the oil from the oil chamber as well as drain the sump, the plug is removed, as described before, and the valve stem is manually maintained in the position shown in Fig. 2, or is maintained in that position by any suitable means. When so held, the oil in the oil chamber and in the entire system will drain therefrom.

The invention claimed is:

1. An oil pan construction including in combination an oil pan, a sump for said oil pan communicating therewith at the lowest point, means for draining said sump, and means for preventing said oil pan from communicating with said sump when the sump is drained.

2. An oil pan construction including in combination an oil pan having an opening in the lowest point thereof, a sump for said oil pan communicating therewith through said opening, means for draining said sump, and means positioned in said opening for preventing said oil pan from communicating with said sump when the latter is drained.

3. An oil pan construction including in combination an oil pan having an opening therein in the lowest point thereof, a sump for said oil pan communicating therewith through said opening, valve means in said opening, and means positioned in said sump for draining the same, said sump draining means automatically seating said valve to prevent said oil pan from communicating with said sump when the latter is being drained.

4. In an oil pan drain valve the combination with an oil pan having an opening therein and a sump positioned beneath the same and communicating therewith through said opening, of a valve seatable in said opening, a stem extending through said opening, a spring surrounding said stem for normally seating said valve, and a sump drainage plug secured in said sump adjacent said opening, said plug normally maintaining the valve in the open position for said oil pan to communicate with said sump when the plug is secured in the sump.

5. In an oil pan construction the combination of a baffle plate having an opening therein, a strainer surrounding said opening, a valve positioned in said oil pan and surrounded by said strainer, said oil pan having an opening closed by said valve, a sump positioned beneath said oil pan and communicating with the same through the second mentioned opening, and means for draining said sump, said draining means automatically seating said valve when the sump is drained and opening said valve when the sump is closed.

In witness whereof, I have hereunto affixed my signature.

JOHN W. APPLIN.